United States Patent [19]

Suzuki

[11] 4,151,245

[45] Apr. 24, 1979

[54] METHOD FOR STRETCHING A THERMO-SOFTENING HIGH MOLECULAR FILM

[75] Inventor: Takashi Suzuki, Takatsuki, Japan

[73] Assignee: Matsushita Electric Industrial Co., Ltd., Japan

[21] Appl. No.: 838,842

[22] Filed: Oct. 3, 1977

Related U.S. Application Data

[63] Continuation of Ser. No. 619,247, Oct. 3, 1975, abandoned, which is a continuation of Ser. No. 421,058, Dec. 3, 1973, abandoned.

[30] Foreign Application Priority Data

Dec. 6, 1972 [JP] Japan .............................. 47-122741
Oct. 26, 1973 [JP] Japan .............................. 48-120884

[51] Int. Cl.² ........................................... B29C 17/02
[52] U.S. Cl. .................................... 264/288; 26/71; 425/446
[58] Field of Search ........... 264/280, 288, 289, 210 R, 264/DIG. 73, 216, 175, 291; 26/71, 72, 99; 425/66, DIG. 53, 404, 445, 446

[56] References Cited

U.S. PATENT DOCUMENTS

| 3,235,644 | 2/1966 | Rasmussen | 264/288 |
| 3,370,111 | 2/1968 | Boone | 425/66 |
| 3,400,196 | 9/1968 | Le Roy | 264/280 |

FOREIGN PATENT DOCUMENTS 689395  3/1953  United Kingdom ................ 264/288

OTHER PUBLICATIONS

"Roll Cleaner and Better Sheet-Faster", Williams, Jr. et al., SPE Journal, Dec. 1971, vol. 27, pp. 42-48.

Primary Examiner—James B. Lowe
Attorney, Agent, or Firm—Stevens, Davis, Miller & Mosher

[57] ABSTRACT

A method of stretching a high molecular film by nipping the film through rubber-like resilient members and applying pressure thereto and an apparatus adapted to carry the method into practice, which apparatus is especially adapted to effect cold stretching of a high molecular film.

2 Claims, 3 Drawing Figures

METHOD FOR STRETCHING A THERMO-SOFTENING HIGH MOLECULAR FILM

This is a continuation of application Ser. No. 619,247 filed Oct. 3, 1975 now abandoned which in turn is a continuation of Ser. No. 421,058, filed Dec. 3, 1973 (now abandoned).

This invention relates to a method and an improved apparatus for stretching a thermo-softening high molecular film.

The term "film" as used herein refers to a film, sheet, web and the like.

It is known that films, which are made of thermoplastic high molecular substances or mixtures of such thermoplastic high molecular substances together with low molecular organic compounds and/or inorganic powdery materials, have desirable mechanical properties such as high tensile strength and high flexibility when the films are stretched by applying high stress to improve their molecular orientation. In addition, if the stretched films are of polyethylene their transparency is increased, and if said stretched films are of polyvinylidene fluoride their electrical properties show a change such that the dielectric constant is increased and a piezo-electric effect occurs.

The methods known in the art of stretching films to improve their molecular orientation are broadly grouped into two types. In one type of method, a film is tensioned by using rolls of different velocities or by holding side edges of the film by clips and pulling the same. In another type of method, pressure is applied to the film by nipping the same between metallic rolls. The latter type is commonly referred to as a calender process.

Some disadvantages are associated with these two types of methods of the prior art. When the method of the former type is employed, difficulty has hitherto been experienced in obtaining a uniform thickness across the width of a stretched film, and marginal portions of the film show irregularities in thickness. Also, the film is liable to be broken when attempts are made to stretch is at low temperature by exerting a high tensile force thereon (cold stretching). Cold stretching can be carried out by using the methods of the latter type, but difficulty has been experienced in producing a film of small thickness of the order of microns and preventing the defect of over-stretching of the marginal portions of the film.

One object of this invention is to provide an improved method of stretching a high molecular film which permits stretching of the high molecular film to produce a film having a small thickness of the order of microns throughout the length thereof and a uniform thickness across the width thereof without having any variation in thickness.

Another object of the invention is to provide an apparatus adapted to stretch a high molecular film such that the high molecular film is stretched to produce a film having a small thickness of the order of microns throughout the length thereof and a uniform thickness across the width thereof without having any variation in thickness.

According to the invention, there is provided a method of stretching a thermo-softening high molecular film comprising the steps of moving the thermo-softening high molecular film in a longitudinal direction while maintaining the film at a temperature below its softening temperature, and exerting on the surface of such film a force tending to expand the film while at the same time exerting a compressive force on the film in the direction of its thickness through rubber-like resilient members.

According to the invention, there is also provided an apparatus for stretching a high molecular film having two sets of rolls and endless rubber belts, each set comprising a plurality of rolls including a pressure applying roll and an endless rubber belt adapted to be trained over the rolls. The two endless belts are brought into alignment with each other in a longitudinal direction and the two pressure applying rolls are arranged to be juxtaposed against each other with the endless belts being held therebetween and brought into engagement with each other by the two pressure applying rolls. The high molecular film is permitted to pass between the runs of the endless belts nipped by the two pressure applying rolls whereby a compressive force oriented in the direction of the thickness of the film and a force tending to expand the film can be exerted on the surface of the film.

Other and additional objects and features of the invention will become evident from the description set forth hereinafter when considered in conjunction with the accompanying drawings.

The term "thermo-softening high molecular film" as used in the description refers to a film or sheet made of polyolefin, polyamides, polyesters, polyethers, polyvinyl and other thermoplastic high molecular materials, their mixture and their copolymers, with a plasticizer and/or a filler being added thereto and the intermolecular bridging occurring locally when necessary. Thus the term covers films made of all the materials which tend to soften at elevated temperatures and show gross deformation. The term "softening temperature" refers to a temperature corresponding to the melting point of a thermoplastic resinous material. A high molecular film to be stretched by the method and apparatus according to the invention is preferably a non-oriented or slightly oriented film produced by melt extrusion or solvent flowing. A highly oriented film is not fit for stretching by the method and apparatus according to the invention because its fiber structure tends to be broken.

Figure 1:
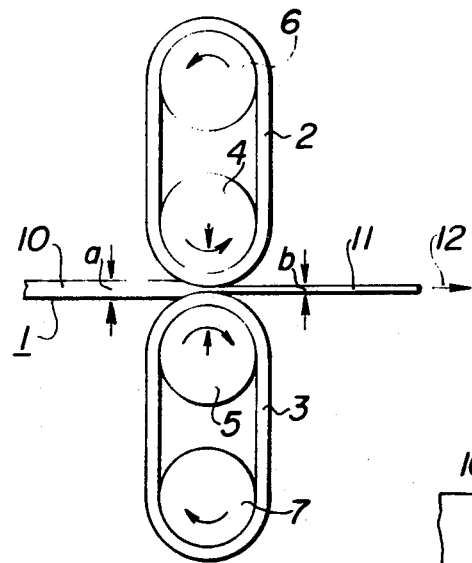
FIG. 1 is a view of a stretching apparatus in explanation of the principles of this invention.
Figure 2:
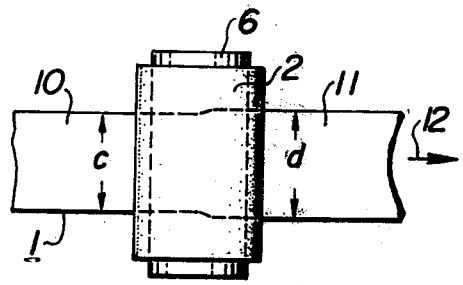
FIG. 2 is a plan view of the apparatus shown in FIG. 1.

In FIG. 1 and FIG. 2, 1 designates a thermo-softening high molecular film. 10 designates a portion of the film 1 before being stretched having a thickness a and a width c, and 11 designates a portion of the film 1 after being stretched having a thickness b and a width d. 2 and 3 are endless belts made of rubber or other resilient material. 4 and 5 are pressure applying and drive metallic rolls adapted to apply pressure to the film 1 through the endless belts 2 and 3 while driving the same, belts 2 and 3 being trained around rolls 4 and 5 respectively. 6 and 7 are auxiliary rolls. An arrow 12 indicates the direction of movement of the film 1.

Pressure is applied to the film 1 by the rolls 4 and 5 through the belts 2 and 3 respectively while the film 1 moves in the direction of the arrow 12. As a result, the film 1 is expanded as the surfaces of the belts are stretched and at the same time compressed in the direction of its thickness by the pressure applied by the rolls, so that the thickness a of the film prior to the stretching operation is reduced to the thickness b after the operation and the width c changes into the width d. Thus the film 1 is stretched.

The film can be stretched to 1.2 to 1.5 times its original length, so that it is necessary to perform a stretching operation several times in order to stretch the film satisfactorily. Generally, stretching of the film is carried out by using several or ten-odd roll apparatus arranged in relationship in the direction of movement of the film 1 and increasing the velocity of the rolls as the film is gradually stretched. The film 1 to be stretched is at a temperature below the melting point or softening temperature of the film or at a temperature less than the softening temperature of the film by 20° C. or more. When it is desired to obtain a high molecular orientation in a film, stretching of the film is effected at a temperature less than the softening temperature of the film by 50° C. or more.

One of the subject features of the invention is that cold stretching can be readily effected.

The conventional stretching method relying on a tensile force alone has been incapable of continuously effecting cold stretching of an elongated film, because necking tends to occur in the film and the need to use a tensile force of high magnitude results in forces being concentrated in weak portions of the film and the film being broken. When the method according to the invention is employed, however, breaking of the film seldom happens because the rubber-like resilient members are maintained in intimate contact with the surfaces of the film and the expanding force is exerted uniformly on the film surface, nor does sudden necking occur.

When the cold stretching method according to the invention is employed, opacity develops in the film in the initial stages of the operations as is the case when the conventional method is used. However, this phenomenon disappears as the operations progress till the film becomes transparent again. This phenomenon appears to be due to the pressure applied by the rolls to the film.

X-ray diffraction inspection of specimens of the film that have become transparent after temporarily becoming opaque shows that the film has a high degree of molecular orientation. It has been found that the film in an opaque state is high in fluid permeability and liquid impregnability. It has also been found that there are close relations between the hardness, viscoelasticity and shape (the thickness if the members are in the form of a belt) of the rubber-like resilient members and the hardness and viscoelasticity of the film to be treated, and that the degree to which the film can be stretched can be varied over a wide range by selecting a suitable combination of these properties. For example, the rubber-like resilient members are required to have a hardness lower than that of a film to be stretched. When the ratio of the former to the latter is in a range from 1 : 1 to 2 : 2, a film obtained by cold stretching is transparent without producing opacity. However, when the ratio is less then 1 : 2, opacity tends to occur in the initial stages of the stretching operation.

The method shown in FIG. 1 and FIG. 2 produces mono-axial orientation in a stretched film. It has been found that the tensile force of the film having mono-axial orientation across the width thereof is much higher than that of a film stretched by the conventional method relying on a tensile force alone. Because of this, no breakage of the film occurs even if orientation is increased by repeatedly stretching the film. However, it is impossible to stretch, by the method according to the invention, a film which has already been treated to improve orientation by the conventional method relying on a tensile force. Such attempt results in breakage of the film.

Another feature of the invention is that a film can be stretched with a high degree of dimensional precision if the film is stretched to less than 1.2 times the original length in one stretching operation, with the width of the film not substantially increasing and a variation in the thickness across the width of the film (a reduction in thickness at marginal portions) being minimized.

When it is desired to effect biaxial stretching, it is preferred to use a stretching apparatus wherein the rolls are arranged such that their axes are disposed at an angle less than 90° with respect to the direction of movement of the film. Also, it is possible to obtain a locally stretched film (the film becomes opaque locally in cold stretching) by periodically altering the pressure applied to the film through the rubber-like resilient members or varying the thickness of the rubber-like resilient members in several portions.

The method according to the invention permits production of a stretched film having a thickness of less than 10 microns. It appears that this is due to good dispersion of forces effected by the rubber-like resilient members.

One form of the apparatus adapted to carry the method according to the invention into practice shown in FIG. 3 will now be described in some detail. As shown, the high molecular film 1 is paid out from a roll at 13 and wound in therefrom at 14. 15 is a film feed roll, and 16 is a draw out roll. 17 and 18 are pressure applying rolls. 19, 20, 21 and 22 are rubber belt advance rolls each having a guide at the edge, and 23 and 24 are endless rubber belts.

The pressure applying rolls of the stretching apparatus according to the invention are made of iron and plated, for example, with hard chromium to provide a gloss surface finish so that the rolls may slide well. Thus the endless rubber belts slide well on the roll surfaces when the film is to be stretched. The pressure applying rolls each have a diameter which is one hundred to ten thousand times the thickness of an unstretched film. The two pressure applying rolls disposed in spaced juxtaposed relationship are capable of having the spacing therebetween adjusted, so that the spacing between them can be controlled or the forces exerted by the rolls on each other can be controlled. Furthermore, at least one of the two pressure applying rolls can be driven for rotation by a drive source.

The endless rubber belts have a hardness which is lower than that of the film to be stretched, a thickness which is ten to one thousand times that of an unstretched film and a width which is greater than that of an unstretched film. Preferably, the endless rubber belts are made of urethane elastomer which has excellent restitution elasticity, elastic recovery and other rubber characteristics and which can readily be processed. Alternatively, natural or synthetic rubber blended with carbon black or the like may be used.

The endless rubber belts each have their thickness reduced to about 50 to 85% of the original thickness when they are brought into contact with the pressure applying rolls. The belt advance rolls each have a guide at the edge as aforementioned to keep the belts from moving in a zigzag direction, in order that the elasticity of the belts may be recovered throughout after one portion of each belt is released from engagement with the respective pressure applying roll before it is brought into engagement therewith again. Preferably, means is provided for controlling the surface temperature of each belt and for cleaning the surface of each belt.

In this apparatus, the film is moved by the endless rubber belts. However, the film may be pulled with a strong force by the pull out roll 16 shown in FIG. 3 so that monoaxial stretching may be effected between the pull out roll 16 and the endless rubber belts. By this arrangement, it is possible to effect, with a high degree of efficiency, monoaxial stretching of a film made of polypropylene or the like which might otherwise be accompanied by necking.

The invention will now be explained in detail with reference to the examples.

EXAMPLE 1

Figure 3:
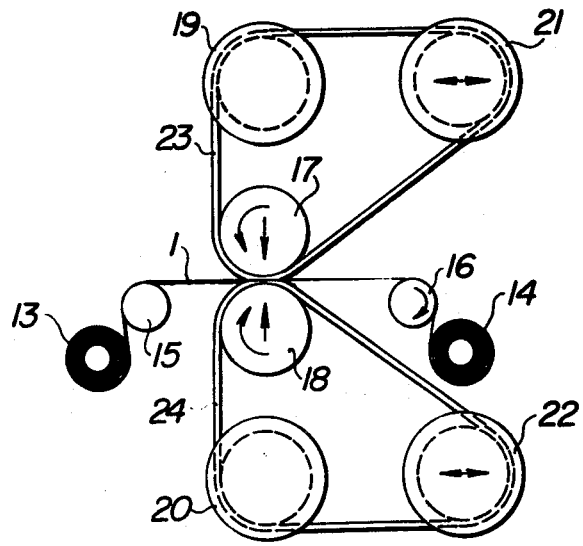
FIG. 3 is a schematic side view of one embodiment of the stretching apparatus adapted to carry the method according to the invention into practice.

A film of polyvinylydene fluoride having a width of 100 millimeters and a thickness of 0.2 millimeter was subjected to a series of stretching operations by using the stretching apparatus shown in FIG. 3 at a stretching temperature of 50° C. The specifications of the pressure applying rolls and endless rubber belts are as follows:

| | |
|---|---|
| Diameter and width of pressure applying rolls: | 200 mm. and 200 mm. |
| Spacing between the pressure applying rolls (fixed): | 3.5 mm. |
| Number of revolutions of the pressure applying rolls: | 10 rpm. |
| Endless rubber belts: | Made of Neoprene and having a hardness of 75° (JIS), a thickness of 2 mm. and a width of 150 mm. |

The film was stretched to 1.1 times its original length each time a stretching operation was performed. The film was opaque after five stretching operations, but became fully transparent after ten stretching operations, with the film being stretched to 2.9 times its original length. The stretched film had a width of 105 millimeters.

The stretched film had a dielectric constant of 12.5 at 20° C. 1KHZ which is considerably higher than the 9.8 of the unstretched film. X-ray diffraction inspection of the stretched film shows that the molecules are of the $\beta$ crystals type and highly oriented.

EXAMPLE 2

A film of a blended material consisting of isotactic polypropylene mixed with low density polyethylene at a ratio 1:1 and having a thickness of 30 microns and a width of 100 millimeters (produced by melt extrusion) was subjected to a series of stretching operations at a stretching temperature of 50° C. by using the same apparatus as described with reference to Example 1.

After being subjected to five consecutive stretching operations, the film was stretched to 3.5 times its original length, with the stretched film being opaque and having a thickness of 10 microns and a width of 102 millimeters. The thickness was substantially uniform across the width, with the difference in thickness between the central portion and marginal portions of the stretched film being less than 0.5 micron. The stretched film had an apparent density of 0.80.

EXAMPLE 3

An unstretched film produced by melt blending 100 parts by weight of isotactic polypropylene and 45 parts by weight of low density polyethylene and extrusion molding the blended materials into a film of 200 microns in thickness and 100 millimeters in width was subjected to a series of stretching operations by using an apparatus similar to that shown in FIG. 3.

Pressure applying rolls having a diameter of 200 millimeters and a width of 300 millimeters were employed, and only the upper roller was rotated at 20 rpm. with a pressure of about one ton being applied to the lower roll (constant pressure). The rubber belts used were made of urethane elastomer and had a hardness of 70° (JIS), a thickness of 5 millimeters, a width of 150 millimeters and a length of about 2 meters. The temperature at the surface of the belts was 40° C.

The film obtained after five stretching operations were performed was opaque and had a thickness of 40 microns and a width of 105 millimeters. It had an apparent density of 0.75.

EXAMPLE 4

A film of high density polyethylene having a thickness of 300 microns and a width of 100 millimeters obtained by extrusion molding was stretched by using the same apparatus as described with reference to Example 3. The conditions under which stretching operations were performed were similar to those of Example 3 except for the fact that the stretching temperature (the temperature at the surface of the belts was 70° C.).

The film obtained by stretching had a thickness of 32 microns, a width of 110 millimeters and an apparant density of 0.90. It had good transparency and a thickness precision of ±5 microns.

From the foregoing description, it will be appreciated that the stretching method and apparatus according to the invention permit various types of high molecular film to be stretched at relatively low temperature into a film which is substantially uniform in thickness across the width thereof and in which a high degree of molecular orientation is obtained. The method will have a high industrial value.

What I claim is:

1. A method of stretching a film which is a thermo-softening high molecular film in a stretching operation consisting essentially of the steps of maintaining said film at a temperature below its softening temperature, moving said film in a longitudinal direction between first and second rubber belts trained around first and second metallic pulleys respectively having their axes of rotation perpendicular to said longitudinal direction, and applying pressure to said film by means of said pulleys through said rubber belts while gripping said film between said belts, said pressure being applied only between said first and second metallic pulleys and being sufficient to exert on the surface of said film a force perpendicular to the surface of said film which expands the film while at the same time exerting a compressive force therein in the direction of its thickness, thereby to stretch said film substantially unidirectionally in a longitudinal direction, wherein the rubber belts have a hardness less than that of said film, a thickness of ten to one thousand times that of said film, a width greater than that of said film before stretching, and the thickness of the rubber belts is reduced to about 50 to 85 percent of their original thickness during said pressure applying step.

2. A method according to claim 1, wherein the high molecular film is stretched to less than 1.5 times its original length in said stretching operation.

* * * * *